United States Patent [19]
Leonard et al.

[11] Patent Number: 6,050,082
[45] Date of Patent: Apr. 18, 2000

[54] INTERCOOLED GAS TURBINE ENGINE WITH INTEGRAL AIR BOTTOMING CYCLE

[75] Inventors: Gary L. Leonard; Narendra D. Joshi, both of Cincinnati, Ohio

[73] Assignee: General Electric Company, Cincinnati, Ohio

[21] Appl. No.: 09/009,192

[22] Filed: Jan. 20, 1998

[51] Int. Cl.$^7$ .................................. F02C 3/04; F02C 6/18
[52] U.S. Cl. ................................... 60/39.161; 60/39.183; 60/39.511; 60/728
[58] Field of Search ........................... 60/39.161, 39.183, 60/39.511, 728

[56] References Cited

U.S. PATENT DOCUMENTS

| | | | |
|---|---|---|---|
| 2,245,954 | 6/1941 | Anxionnaz | 60/728 |
| 2,584,232 | 2/1952 | Sedille | 60/728 |
| 4,751,814 | 6/1988 | Farrell | 60/39.183 |

*Primary Examiner*—Louis J. Casaregola
*Attorney, Agent, or Firm*—Andrew C. Hess; Rodney M. Young

[57] ABSTRACT

A gas turbine engine that includes a ⅔ stage intercooled booster compressor is described. In one embodiment, the engine includes a low pressure turbine and a booster compressor rotatable on a low pressure shaft. The engine further includes a high pressure compressor, a high pressure combustor, and a high pressure turbine rotatable on a high pressure (HP) shaft and forming the core engine. A low pressure combustor is located at the outlet of the high pressure turbine and a power turbine. The booster compressor includes first and second stage compressors, and air flow from the first stage compressor is supplied to a first intercooler, and air flow from the second stage compressor is supplied to a second intercooler. Airflow from the first intercooler is supplied to the inlet of the second stage compressor, and airflow from the second intercooler is split between being provided to the inlet of the high pressure compressor and a recuperator. The recuperator also is coupled to receive air from the power turbine so that air from the power turbine heats air split away from the second stage compressor before being exhausted to atmosphere. Air heated in the recuperator drives the low pressure turbine connected to the booster compressors.

20 Claims, 1 Drawing Sheet

INTERCOOLED GAS TURBINE ENGINE WITH INTEGRAL AIR BOTTOMING CYCLE

FIELD OF THE INVENTION

This invention relates generally to gas turbine engines and more particularly, to a gas turbine engine including an intercooler.

BACKGROUND OF THE INVENTION

Gas turbine engines generally include a high pressure compressor for compressing air flowing through the engine, a combustor in which fuel is mixed with the compressed air and ignited to form a high energy gas stream, and a high pressure turbine. The high pressure compressor, combustor and high pressure turbine sometimes are collectively referred to as the core engine. Such gas turbine engines also may include a low pressure compressor, or booster, for supplying compressed air, for further compression, to the high pressure compressor.

Gas turbine engines are used in many applications, including in aircraft, power generation, and in ships. The desired engine operating characteristics vary, of course, from application to application. More particularly, when the ambient temperature is lower, the core engine can operate to output a higher shaft horse power (SHP) without increasing the core engine temperature to unacceptably high levels. On a hotter day, however, the core engine temperature may rise to an unacceptably high level if a high SHP output is being delivered.

To satisfy the demand for an engine which can output a high SHP even when the engine ambient temperature is high, e.g., on hot days, inlet system evaporative coolers or refrigeration systems which reduce inlet air temperature typically are utilized. It also is known to use water spray fogging devices to inject water into either the booster or the compressor. Such coolers or other refrigeration systems are used on hot days to cool the air supplied to the core engine and enable increased horsepower output.

Although coolers, refrigeration systems and fogging devices are effective in facilitating high power output from a gas turbine engine on a hot day, these known systems and devices also typically require water pumps, pressurized air for aspiration, and other components which increase the engine cost, including maintenance cost. In addition, such systems and devices require water clean-up.

It would be desirable to provide a gas turbine engine which is operable to output a high SHP even on hot days while the core engine operates at a level of low severity. It also would be desirable to provide such an engine which is not significantly more expensive, in both material and maintenance, than known engines, does not require significant water clean-up, and is relatively simple to operate.

SUMMARY OF THE INVENTION

These and other objects may be attained by a gas turbine engine that includes a ⅔ stage intercooled booster compressor. More particularly, and in one embodiment, the engine includes a low pressure turbine and a booster compressor rotatable on a low pressure shaft. The engine further includes a high pressure compressor, a high pressure combustor, and a high pressure turbine rotatable on a high pressure (HP) shaft and forming the core engine. The engine further includes a low pressure combustor at the outlet of the high pressure turbine and a power turbine.

The booster compressor includes first and second stage compressors, and air flow from the first stage compressor is supplied to a first intercooler, and air flow from the second stage compressor is supplied to a second intercooler. Airflow from the first intercooler is supplied to the inlet of the second stage compressor, and airflow from the second intercooler is split between being provided to the inlet of the high pressure compressor and a recuperator. The recuperator also is coupled to receive air from the power turbine so that air from the power turbine heats air split away from the second stage compressor before being exhausted to atmosphere. Air heated in the recuperator drives the low pressure turbine connected to the booster compressors.

The above described cycle enables the elimination of hardware typically used in external bottoming cycle engines. In addition, the low pressure combustor raises the temperature of air entering the power turbine and, as a result, the temperature of air entering the recuperator heat exchanger is increased which increases the energy available to drive the booster compressor.

DETAILED DESCRIPTION

Figure 1:
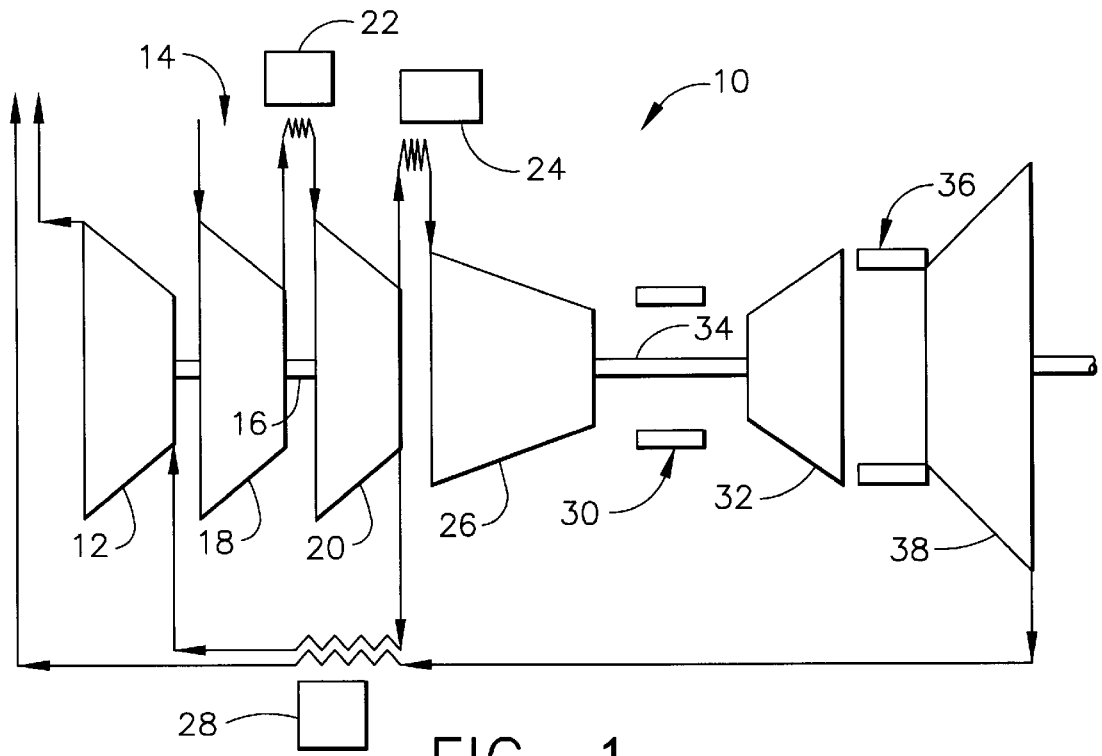
FIG. 1 is a schematic illustration of a gas turbine engine in accordance with one embodiment of the present inventions.

FIG. 1 illustrates, in schematic form, a gas turbine engine 10 in accordance with one embodiment of the present invention. Engine 10 may be particularly useful in industrial applications, such as to drive an electric generator. Engine 10, however, may be used in many other applications.

Referring specifically to the Figure, engine 10 includes a low pressure turbine 12 coupled to a booster compressor 14 by a low pressure shaft 16. Booster compressor 14 includes a first stage compressor 18 and a second stage compressor 20. A first intercooler 22 receives airflow from first stage compressor 18 and supplies cooled air to second stage compressor 20. A second intercooler 24 receives airflow from second stage compressor 20 and supplies cooled air to both a high pressure compressor 26 and a recuperator 28. First and second intercoolers 22 and 24 may be, for example, air-to-air type intercoolers.

Engine 10 also includes a high pressure combustor 30 and a high pressure turbine 32. High pressure compressor 26 and high pressure turbine 32 are coupled by a high pressure shaft 34. A low pressure combustor 36 is located at the outlet of high pressure turbine 32, and a power turbine 38 is positioned at an outlet of low pressure combustor 36. Power turbine 38 could be free wheeling or coupled to first and second stage compressors 18 and 20.

Exhaust from power turbine 38 is supplied to recuperator 28. Heated air from recuperator 28 is supplied to, and drives, low pressure turbine 12. Particularly, heated air from power turbine 38 is utilized to heat air split away from high pressure compressor 26 before being exhausted to atmosphere. The heated air drives low pressure turbine 12 and is then exhausted to atmosphere.

Each of the components of engine 10 described above are well known and commercially available. For example, such components are commercially available from General Electric Company, Cincinnati, Ohio.

In operation, air at atmospheric pressure is drawn into booster compressor 14. First stage compressor 18 compresses the air, and first intercooler 22 cool such air and the cooled air is supplied to the inlet of second stage compressor 20. Air compressed by second stage compressor 20 is supplied to second intercooler 24, and the cooled air from second intercooler 24 is supplied to high pressure compressor 26 and recuperator 28. High pressure compressor further compresses the air and supplies the air to high pressure combustor 30. The exhaust from combustor 30 drives high pressure turbine 34, and air from high pressure turbine 34 is combusted in low pressure combustor 36. The exhaust from low pressure combustor 36 drives low pressure turbine 38, and the air from turbine 38 is supplied to recuperator 28. As explained above, heated air from power turbine 38 is utilized to heat air split away from high pressure compressor 26 before being exhausted to atmosphere. The heated air drives low pressure turbine 12 and is then exhausted to atmosphere.

Low pressure combustor 36 raises the temperature of the air entering power turbine 38. As a result, the temperature of air entering recuperator heat exchanger 28 is increased which increases the energy available to drive booster compressor 14. It is believed that efficiencies similar to combined cycle plants which include steam bottoming cycles could be obtained with the above described cycle. The above described cycle also enables the elimination of hardware typically used in external bottoming cycle engines.

Figure 2:
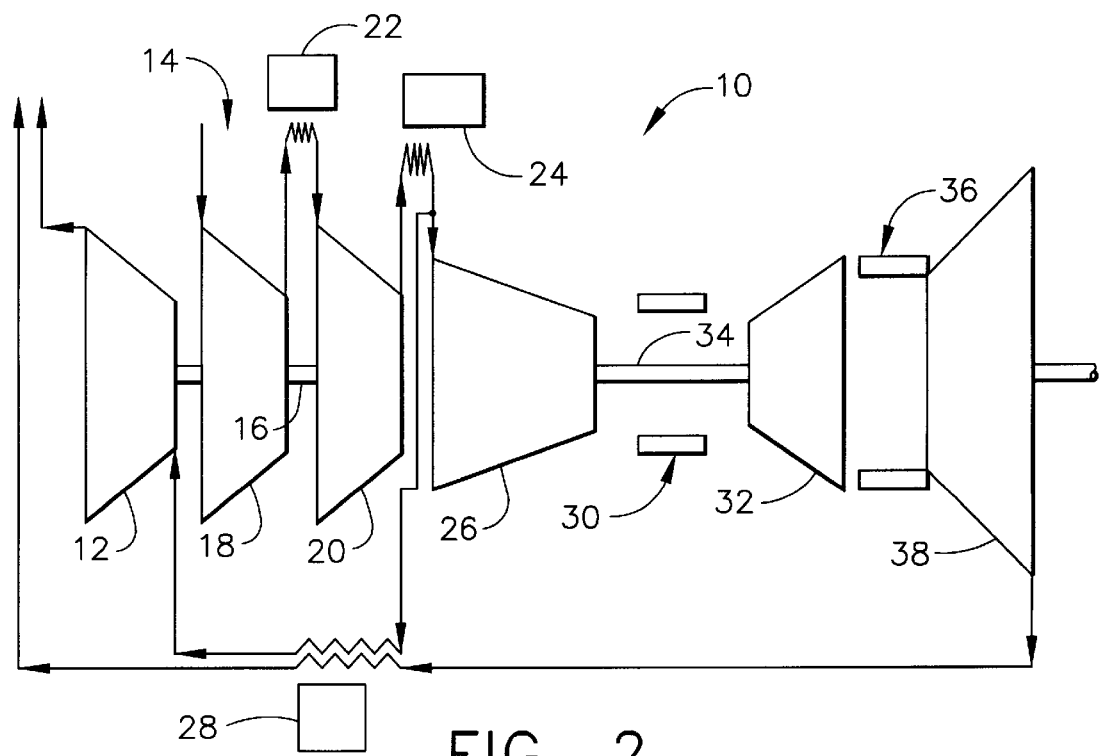
FIG. 2 is a schematic illustration of a gas turbine engine in accordance with another embodiment of the present inventions.

Of course, variations and modifications of the above described cycle are possible. For example, FIG. 2 is a schematic illustration of gas turbine engine 10 modified so that the outlet of second intercooler 24 is coupled to both the inlet of compressor 26 and the inlet of recuperator 28. In this embodiment, the output of second stage compressor 20 is not supplied directly to recuperator 28. As another modification, booster compressor 14 could be divided into a front section and an aft section. The front section could be driven by the bottoming cycle and the aft section could be driven by turbine 38. Also, low pressure combustor 36 could be eliminated. Eliminating combustor 36 may compromise engine output and efficiency but would reduce the complexity and possibly the costs of the cycle.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A gas turbine engine comprising:
    a first low pressure turbine;
    a booster compressor comprising a first stage compressor and a second stage compressor, said booster compressor coupled to said first low pressure turbine by a first shaft;
    a high pressure compressor;
    a recuperator heat exchanger downstream from said booster compressor and coupled to said first low pressure turbine;
    a first intercooler coupled to an outlet of said first stage compressor and to an inlet of said second stage compressor; and
    a second intercooler coupled to an outlet of said second stage compressor and to an inlet of said high pressure compressor.

2. An engine in accordance with claim 1 wherein said second stage compressor is further coupled to an inlet of said recuperator heat exchanger.

3. An engine in accordance with claim 1 wherein said second intercooler is further coupled to an inlet of said recuperator.

4. An engine in accordance with claim 2 wherein said first and second intercoolers are air-to-air type intercoolers.

5. An engine in accordance with claim 1 further comprising:
    a high pressure combustor located at an outlet of said high pressure compressor; and
    a high pressure turbine coupled to said high pressure compressor by a second shaft.

6. An engine in accordance with claim 5 further comprising a second low pressure turbine downstream from said high pressure turbine.

7. An engine in accordance with claim 6 wherein said second low pressure turbine is a power turbine.

8. An engine in accordance with claim 6 further comprising a low pressure combustor positioned intermediate said high pressure turbine and said second low pressure turbine.

9. An engine in accordance with claim 6 wherein an outlet of said second low pressure turbine is coupled to said recuperator heat exchanger.

10. An engine in accordance with claim 8 wherein an outlet of said recuperator heat exchanger is coupled to said first low pressure turbine.

11. A gas turbine engine comprising:
    a first low pressure turbine;
    a booster compressor comprising a front section compressor and a second section compressor, said front section compressor coupled to said first low pressure turbine by a first shaft;
    a high pressure compressor;
    a recuperator heat exchanger downstream from said booster compressor and coupled to said first low pressure turbine;
    a high pressure combustor located at an outlet of said high pressure compressor;
    a first intercooler coupled to an outlet of said front section compressor and to an inlet of said second section compressor; and
    a high pressure turbine coupled to said high pressure compressor by a second shaft.

12. An engine in accordance with claim 11 further comprising a second low pressure turbine downstream from said high pressure turbine.

13. An engine in accordance with claim 11 further comprising a second low pressure turbine, said second section compressor comprises an aft section compressor driven by said second low pressure turbine.

14. An engine in accordance with claim 11 further comprising a low pressure combustor positioned intermediate said high pressure turbine and said second low pressure turbine.

15. An engine in accordance with claim 11 wherein an outlet of said second low pressure turbine is coupled to said recuperator and an outlet of said recuperator heat exchanger is coupled to said first low pressure turbine.

16. A gas turbine engine comprising:
    a first low pressure turbine;
    a booster compressor comprising a first stage compressor and a second stage compressor, said booster compressor coupled to said first low pressure turbine by a first shaft;
    a high pressure compressor;
    a recuperator heat exchanger, an outlet of said recuperator heat exchanger coupled to said first low pressure turbine;

a first intercooler coupled to an outlet of said first stage compressor and to an inlet of said second stage compressor;

a second intercooler coupled to an outlet of said second stage compressor and to an inlet of said high pressure compressor, at least one of said intercoolers coupled to an inlet of said recuperator;

a high pressure combustor located at an outlet of said high pressure compressor;

a high pressure turbine coupled to said high pressure compressor by a second shaft; and a second low pressure turbine downstream from said high pressure turbine, an outlet of said second low pressure turbine coupled to said recuperator heat exchanger.

17. An engine in accordance with claim 16 wherein said second low pressure turbine is a power turbine.

18. An engine in accordance with claim 16 further comprising a low pressure combustor positioned intermediate said high pressure turbine and said second low pressure turbine.

19. An engine in accordance with claim 16 wherein said second stage compressor is further coupled to an inlet of said recuperator heat exchanger.

20. An engine in accordance with claim 16 wherein said second intercooler is further coupled to an inlet of said recuperator.

* * * * *